US008396003B2

(12) United States Patent  
Leinonen et al.

(10) Patent No.: US 8,396,003 B2
(45) Date of Patent: Mar. 12, 2013

(54) CONTROL OF RADIO PROCESS

(75) Inventors: Marko E. Leinonen, Haukipudas (FI);
Anu Leinonen, Haukipudas (FI); Seppo Rousu, Oulu (FI); Juha Valtanen, Oulu (FI)

(73) Assignee: Nokia Corporation, Espoo (FI)

( * ) Notice: Subject to any disclaimer, the term of this patent is extended or adjusted under 35 U.S.C. 154(b) by 450 days.

(21) Appl. No.: 12/003,607

(22) Filed: Dec. 28, 2007

(65) Prior Publication Data

US 2009/0168800 A1 Jul. 2, 2009

(51) Int. Cl.
*H04B 15/00* (2006.01)

(52) U.S. Cl. .......... 370/252; 455/7; 455/9; 455/39; 455/500; 455/67.11; 455/91; 455/115.1

(58) Field of Classification Search ........ 370/241, 370/252; 455/7, 9, 39, 515, 63.1, 67.11, 455/91, 115.1
See application file for complete search history.

(56) References Cited

U.S. PATENT DOCUMENTS

| 5,146,187 | A | | 9/1992 | Vandegraaf et al. | |
|---|---|---|---|---|---|
| 5,423,064 | A | * | 6/1995 | Sakata | 455/437 |
| 6,049,725 | A | * | 4/2000 | Emmert et al. | 455/573 |
| 6,069,525 | A | * | 5/2000 | Sevic et al. | 330/51 |
| 6,587,686 | B1 | * | 7/2003 | Cuffaro et al. | 455/423 |
| 7,170,951 | B1 | * | 1/2007 | Perthold et al. | 375/296 |
| 8,170,063 | B2 | * | 5/2012 | Leinonen et al. | 370/480 |
| 2002/0118074 | A1 | | 8/2002 | Jovenin | |
| 2004/0171358 | A1 | * | 9/2004 | Karjalainen et al. | 455/126 |
| 2004/0176039 | A1 | * | 9/2004 | Leyh et al. | 455/67.11 |
| 2006/0223444 | A1 | * | 10/2006 | Gross et al. | 455/67.13 |
| 2007/0281620 | A1 | * | 12/2007 | Rubin et al. | 455/63.1 |
| 2008/0153440 | A1 | * | 6/2008 | Rhee et al. | 455/137 |
| 2008/0268786 | A1 | * | 10/2008 | Baker et al. | 455/67.11 |

FOREIGN PATENT DOCUMENTS

| DE | 29809632 U1 | | 10/1998 |
|---|---|---|---|
| FR | 2726724 A1 | | 5/1996 |
| JP | 10-93475 | * | 4/1998 |
| WO | 2006085139 A2 | | 8/2006 |
| WO | WO 2006128948 A1 | * | 12/2006 |

OTHER PUBLICATIONS

International Search Report for international application No. PCT/IB2008/003638 filed Dec. 23, 2008.

* cited by examiner

*Primary Examiner* — Charles C Jiang
(74) *Attorney, Agent, or Firm* — Squire Sanders (US) LLP

(57) ABSTRACT

An apparatus controlling multiple radio processes for simultaneous operation At least one of the radio processes uses a substantially continuous transmitter. A controller is configured to determine an interference level and change parameters in the transmitter in order to reduce the interference level. Parameters controlled by the controller include the transmission frequency, modulation method, signal level and a received signal quality.

24 Claims, 7 Drawing Sheets

Figure 3

Figure 1:
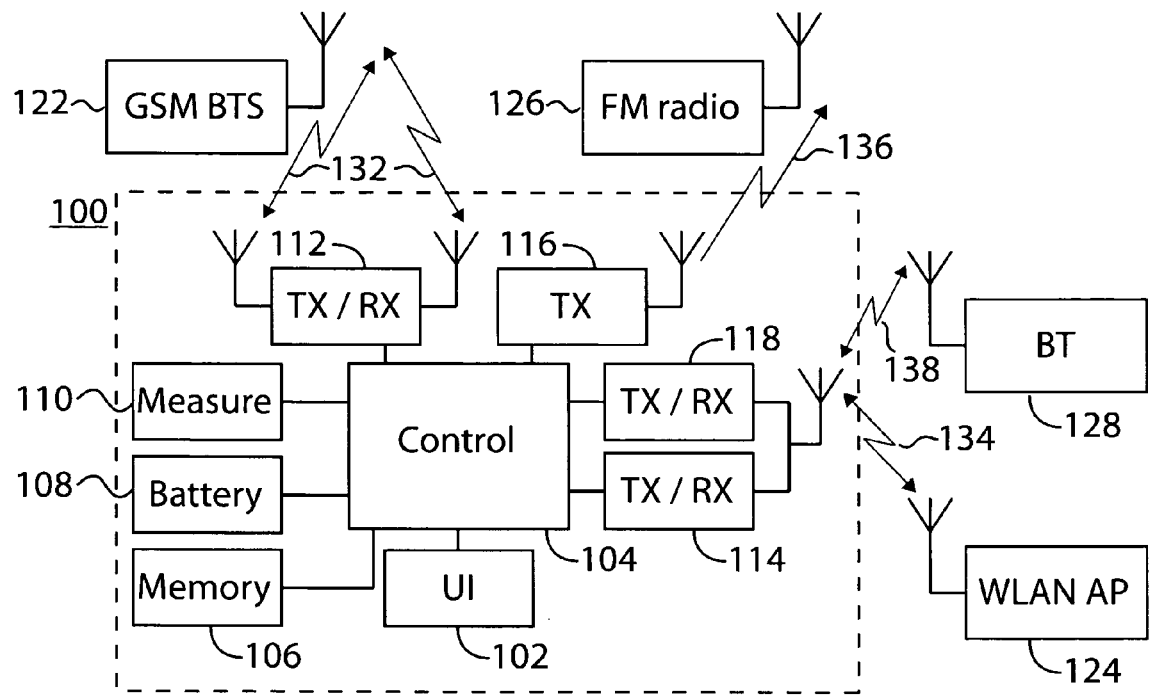

| n*f$_0$ | 88 | 108 |
|---|---|---|
| 2 | 176 | 216 |
| 3 | 264 | 324 |
| 4 | 352 | 432 |
| 5 | 440 | 540 |
| 6 | 528 | 648 |
| 7 | 616 | 756 |
| 8 | 704 | 864 |
| 9 | 792 | 972 |
| 10 | 880 | 1080 |
| 11 | 968 | 1188 |
| 12 | 1056 | 1296 |
| 13 | 1144 | 1404 |
| 14 | 1232 | 1512 |
| 15 | 1320 | 1620 |
| 16 | 1408 | 1728 |
| 17 | 1496 | 1836 |
| 18 | 1584 | 1944 |
| 19 | 1672 | 2052 |
| 20 | 1760 | 2160 |
| 21 | 1848 | 2268 |
| 22 | 1936 | 2376 |
| 23 | 2024 | 2484 |
| 24 | 2112 | 2592 |
| 25 | 2200 | 2700 |

CONTROL OF RADIO PROCESS

FIELD OF THE INVENTION

The invention relates to controlling of one or more radio communication processes. More specifically, the invention relates to a method and apparatus for reducing interference on a radio frequency communication by operation of a transmitter that transmits in a continuous or substantially continuous manner.

BACKGROUND OF THE INVENTION

The number of different radios in mobile communication devices is steadily increasing to facilitate more flexible connectivity and a broader range of services. Cellular access alone is no longer sufficient, but new wireless technologies are integrated into communication devices today and especially in the future to enable novel connectivity solutions. Integration of multiple radios into a single terminal, however, introduces a serious integration challenge that is becoming more pronounced as the number of radios increases. One element of the integration challenge is the appropriate handling of simultaneous operation of radios. It is quite evident that users are willing to use different radios at the same time, like using a headset employing wireless Bluetooth® technology during a GSM phone call, using a wireless local area network (WLAN) connection for Internet surfing while using a frequency modulation (FM) transmitter for listening to stored sound and music files at a remote FM receiver, for example.

If two or more operational radio connections are provided from one communication device, the connections may very well interfere with one another. Even if the connections are not operating on the same frequency band, they may still interfere with each other due to non-ideal properties of components of the communication device. The components may introduce spectral leakage, and the selectivity of receivers may not be ideal, meaning that they may also receive signal components belonging to a signal other than the desired one. Especially harmonics of a transmission frequency and mixing products are likely to cause interference as they often peak in spectral power outside the desired band. An analysis of harmonics can be done by calculating integer multiples of a transmission frequency or frequency used in the transmitter, for example an oscillator frequency. The analysis of mixing products is more complex, as two or more frequencies are involved. Typically, the sums and differences of the two or more frequencies ($f_1$, $f_2$, etc.) are calculated, including sums and differences of harmonics, e.g. $f_1+2*f_2$. All transmissions should be taken into account for the analysis, including unwanted transmissions by components in a device that are not meant to radiate, like memory card readers or buzzers.

If a number of connections operate simultaneously in the same band, the interference they cause to one another is much more severe than if they were operating in separate bands. These connections cause inter-system interference to one another, which may result in a degraded quality of service. This may happen because both connections operate from the same communication device, and thus the radio transceivers may be located within a few centimeters from each other. They may also be using the same radio components, like an antenna, for instance.

If only non-continuous transmitters, i.e. transmitters that send out data in time slots, are involved, a scheduler which schedules radio communication processes may avoid such inter-system interference by putting the transmission(s) and/or reception(s) in adjacent time-slots, thus avoiding simultaneous operation. However, if a continuous, or a substantially continuous, transmission is involved, a different solution has to be found.

Here, a substantially continuous transmission is understood to be a transmission in which the transmitter is active all the time or in which the activity of the transmitter occupies so much time that no time slots are left over for other wireless communication interfaces to operate. Thus, a continuous transmission is a transmission that is incompatible with slotted transmissions of other radio units, so that simultaneous transmission cannot be avoided.

For example, a substantially continuous transmitter may be required to switch off the transmitter for 10 microseconds in regular or irregular intervals. As transmission bursts of TDMA or TDD systems are longer than 10 microseconds, the scheduler cannot put transmissions of the substantially continuous transmitter and the TDMA or TDD system in adjacent time-slots in order to avoid simultaneous operation.

SUMMARY OF THE INVENTION

According to an aspect of the invention, there is provided a method comprising monitoring an activity of a substantially continuous transmitter and monitoring an activity of at least one wireless communication interface. A wireless communication interface is meant to comprise a transmitter or a receiver or both.

If an interference situation occurs, i.e. if the substantially continuous transmitter is active and the at least one wireless communication interface is active with a reception or transmission activity, an interference level is calculated, i.e. it is calculated how much interference is caused by the substantially continuous transmitter in the wireless communication interface. When the wireless communication interface is transmitting a signal an interference level of the simultaneous transmissions in a remote receiver can be calculated as well.

The determined interference level is compared to a threshold. If the interference level is above the threshold, a new value for at least one transmission parameter of the substantially continuous transmitter is determined, so that the interference level is reduced. The at least one transmission parameter is changed to the new value.

In a first embodiment, the transmission parameter is a transmission frequency. So, if it is determined that the substantially continuous transmitter causes interference in the wireless communication interface, a new transmission frequency is determined for operation of the substantially continuous transmitter.

In further embodiments, the transmission parameter can be a parameter of a block of the substantially continuous transmitter, e.g. an oscillator, or a block of the signal path of the substantially continuous transmitter, e.g. a filter or an amplifier. Furthermore, the transmission parameter can be information whether to switch a block into the signal path of the substantially continuous transmitter. In this case, the transmission parameter contains information on switches. The transmission parameter can be stored as an index to a filter that is switched into a certain position of the signal path.

In a further embodiment, the substantially continuous transmitter informs possible receivers of its transmission about the new value of the at least one transmission parameter, e.g. the new transmission frequency, by including such information in a data channel of its transmission.

In a further embodiment, the one or more transmission parameters are selected based on at least one of the following: an operational frequency, a modulation method, a number of sub-carriers of the transmission, a transmission power level, or a signal quality of the transmitted signal that are used in the substantially continuous transmitter. Additionally, information about frequency of harmonics and power levels of harmonics can be used as input for the selection. Additionally, at least one of following reception parameters can be used as input information for the selection: a received signal level, a received signal quality of one or more of the wireless communication interfaces, a modulation method of the received signal, or a number of sub-carriers of a received signal. Any part of this information can be used individually or in combination to select the one or more transmission parameters.

In a further embodiment, the at least one transmission parameter is communicated to the at least one wireless communication interface before changing the at least one transmission parameter of the substantially continuous transmitter to the new value. This may be done, if the substantially continuous transmitter and the at least one wireless communication interface are located in different devices.

In yet another embodiment, the substantially continuous transmitter is a continuous transmitter, i.e. a transmitter that transmits without interval or interruptions as long as it is switched on.

In a further embodiment, a method is described in which an apparatus transmits in an FM band on a first transmission frequency. A controller in the apparatus receives information on unused channels in the FM band, and further information on activities of one or more wireless communication interfaces. The controller calculates interference levels for the one or more wireless communication interfaces based on the FM transmission on the first transmission frequency. It selects a second transmission frequency for transmission in the FM band for which the interference levels in the one or more wireless communication interfaces are below predetermined thresholds. The controller changes transmission in the FM band to the second transmission frequency.

According to a further aspect, there is provided an apparatus comprising a substantially continuous transmitter and at least one wireless communication interface. The substantially continuous transmitter sends out a continuous radio frequency signal. However, the invention includes also a transmitter that sends out a radio frequency signal with short intervals, i.e. intervals or discontinuities of transmission that are too short for scheduling an operation of the at least one wireless communication interface in the intervals. Thus, the resulting interference situation cannot be solved by scheduling the transmission and reception activities.

The apparatus also comprises a processor that is configured to determine an interference level of the substantially continuous transmitter in the one or more wireless communication interfaces. The processor is further configured to compare the interference level with a threshold, and if the interference level is above the threshold, a new value of a transmission parameter of the substantially continuous transmitter may be determined and furthermore be implemented in the transmitter, e.g. by the processor.

In a further embodiment, there is provided an apparatus comprising a substantially continuous transmitter and at least one wireless communication interface configured to receive an indication of an interference level. The indication may have further details about the interference, like interference frequency, interference level etc. The apparatus comprises a processor configured to determine a new value of a transmission parameter of the substantially continuous transmitter that reduces the interference level. The processor then provides the new value for the at least one transmission parameter to the substantially continuous transmitter. Furthermore, the processor may be configured to determine whether the interference level is caused by the substantially continuous transmitter. If the processor determines that the interference level cannot be caused by the substantially continuous transmitter, it ignores the indication. If the processor determines that the interference level can be caused by the substantially continuous transmitter, it proceeds by determining a new value of a transmission parameter and providing it to the substantially continuous transmitter.

In an alternative embodiment, the indication of an interference level is a request for reduced interference operation.

In a further embodiment of the method aspect, a method is described comprising monitoring an interference characteristic of a wireless communication interface. The interference characteristic may comprise an interference level or a quality estimate. If at least one parameter of the interference characteristic is outside a desired range, the method further comprises generating a request for an interfering transmitter to adjust at least one operating parameter other than a timing parameter of the transmission.

In another embodiment of the apparatus aspect, an apparatus is described comprising a measurement unit configured to monitor an interference characteristic of a wireless communication interface, and a processor configured to generate a request for an interfering transmitter to adjust at least one operating parameter, other than a timing parameter of the transmission, responsive to at least one parameter of the interference characteristic being outside a desired range.

In another aspect, there is provided an apparatus comprising a substantially continuous transmitting means, at least one transceiving means, a processing means wherein the processing means is configured to determine an interference level of the substantially continuous transmitting means in the at least one transceiving means, the processing means being further configured to compare the interference level with a threshold, and if the interference level is above the threshold, determine a new value of a transmission parameter of the substantially continuous transmitting means that reduces the interference level, the processing means being further configured to change the at least one transmission parameter of the substantially continuous transmitting means to the new value.

In another aspect, there is provided a computer program product encoding a computer program of instructions for executing a computer process, comprising monitoring an activity of a substantially continuous transmitter, monitoring an activity of at least one wireless communication interface, if the substantially continuous transmitter is active and the at least one wireless communication interface is active, determining an interference level of the substantially continuous transmitter in the at least one wireless communication interface, if the determined interference level is above a threshold, determining a new value for at least one transmission parameter of the substantially continuous transmitter that reduces the interference level, and changing the at least one transmission parameter of the substantially continuous transmitter to the new value.

In another aspect, there is provided a computer program distribution medium readable by a computer and encoding a computer program of instructions for executing a computer process, monitoring an activity of a substantially continuous transmitter, monitoring an activity of at least one wireless communication interface, if the substantially continuous transmitter is active and the at least one wireless communication interface is active, determining an interference level of the substantially continuous transmitter in the at least one wireless communication interface, if the determined interference level is above a threshold, determining a new value for at least one transmission parameter of the substantially continuous transmitter that reduces the interference level, and changing the at least one transmission parameter of the substantially continuous transmitter to the new value.

DRAWINGS

Figure 2:
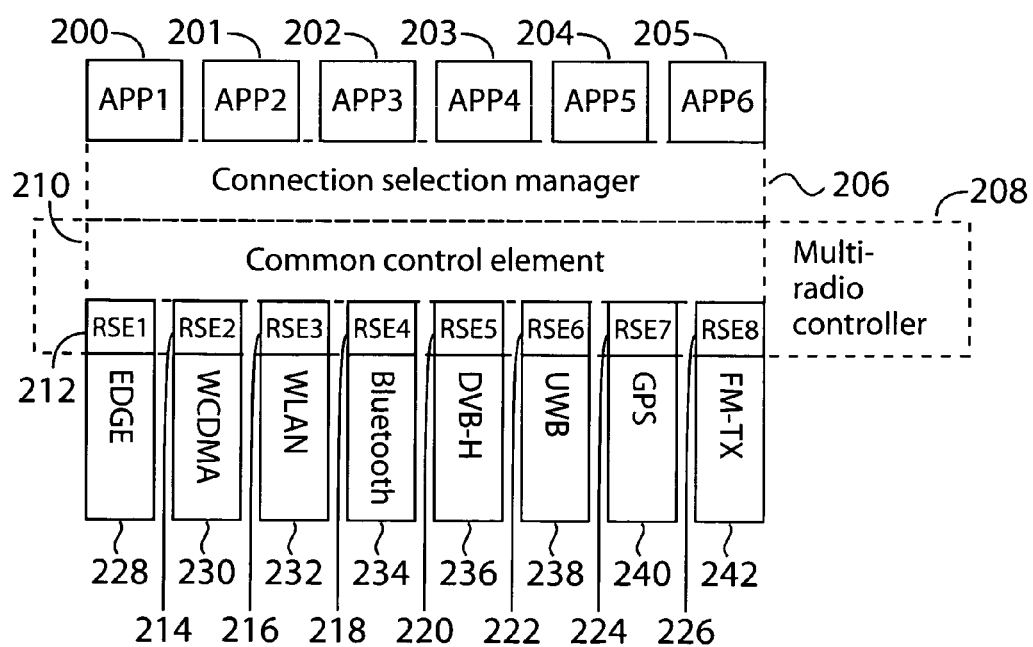
Figure 4:
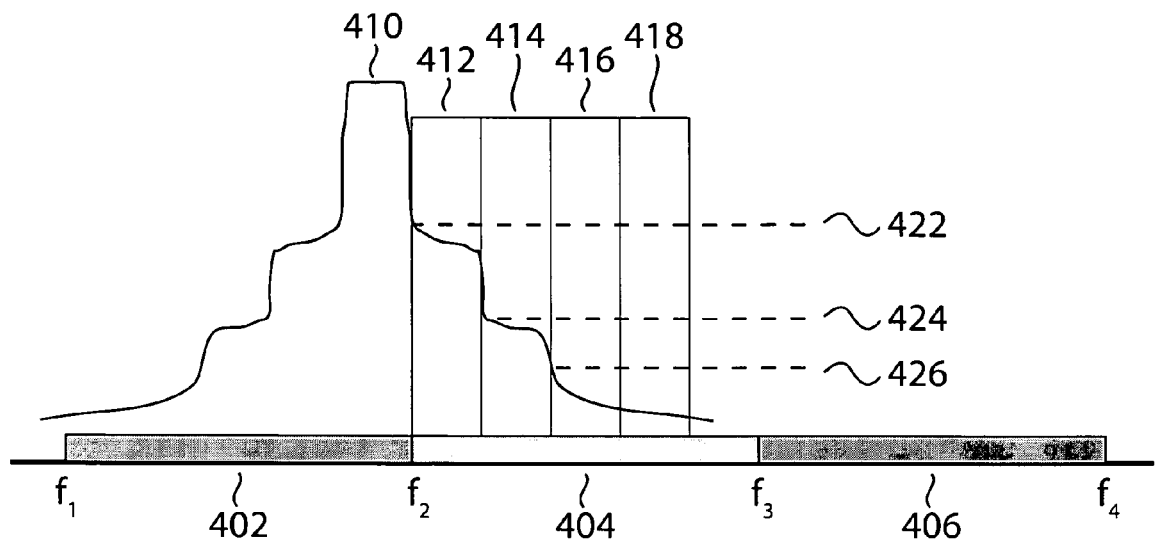
Figure 6:
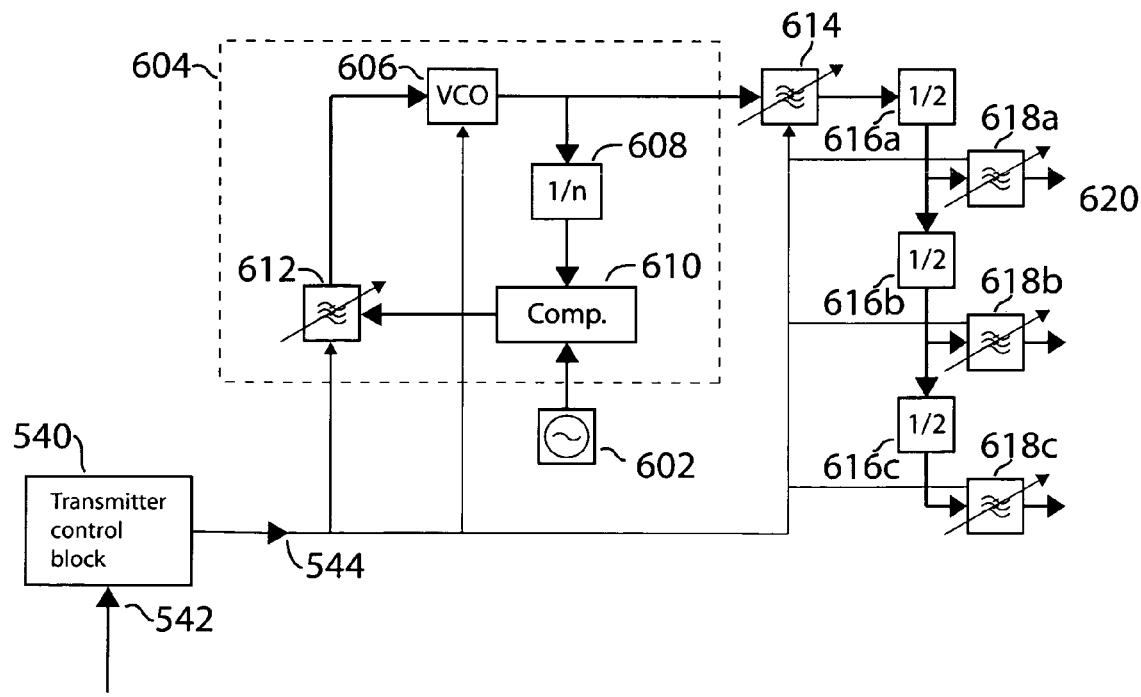
Figure 5A:
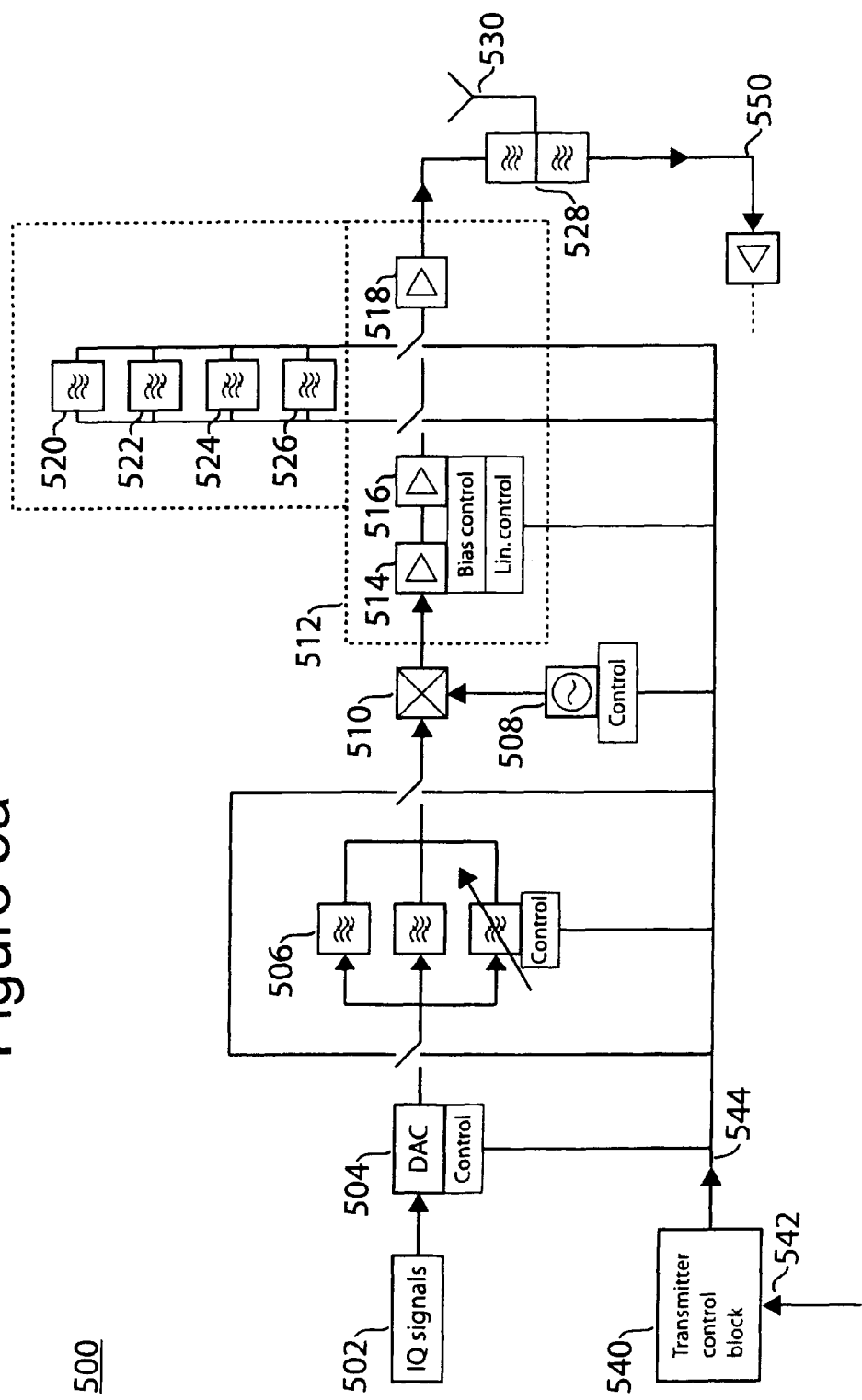
Figure 5B:
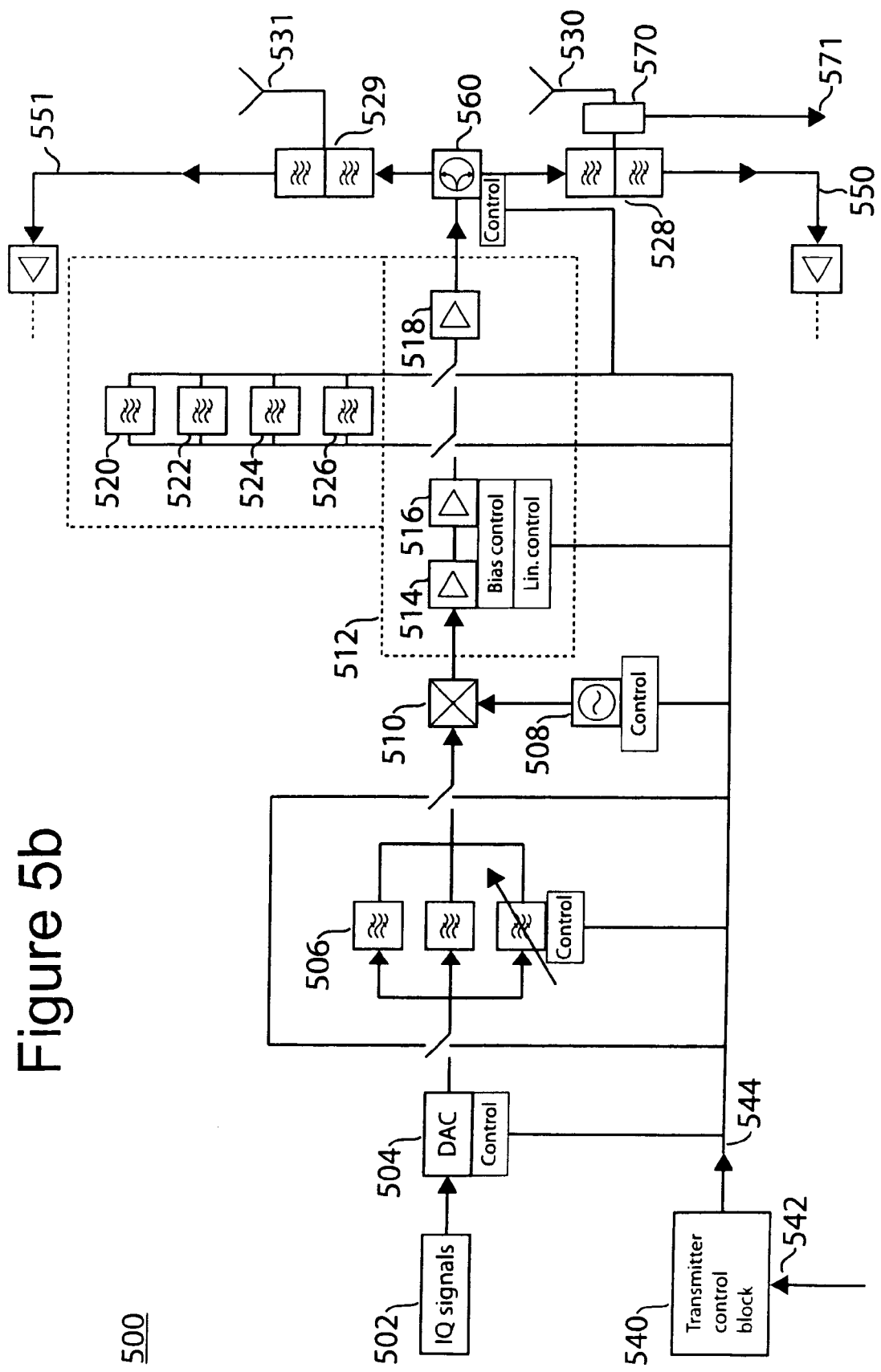
Figure 7:
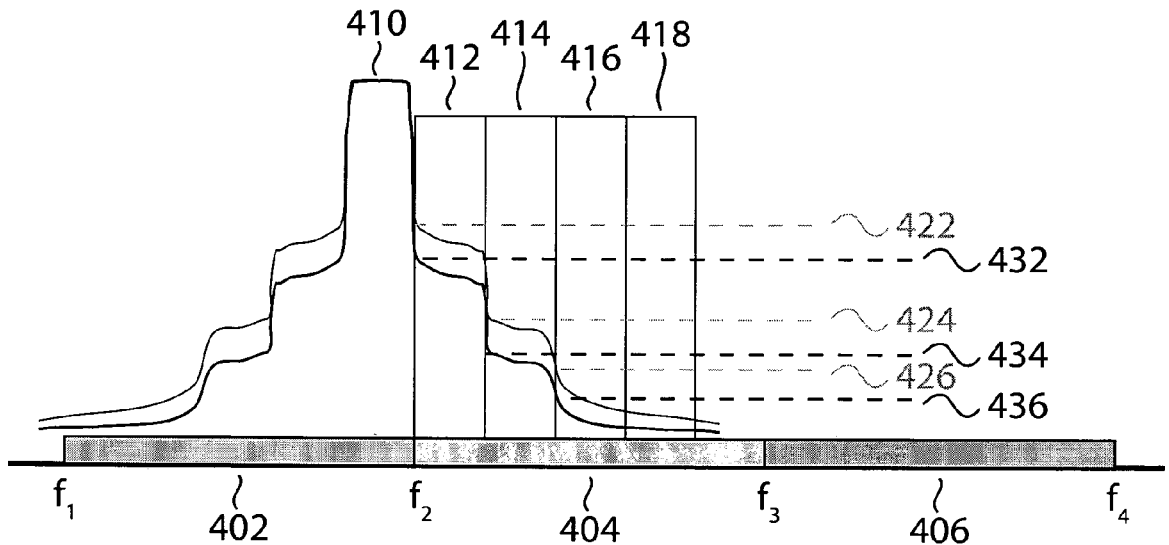
Figure 8:
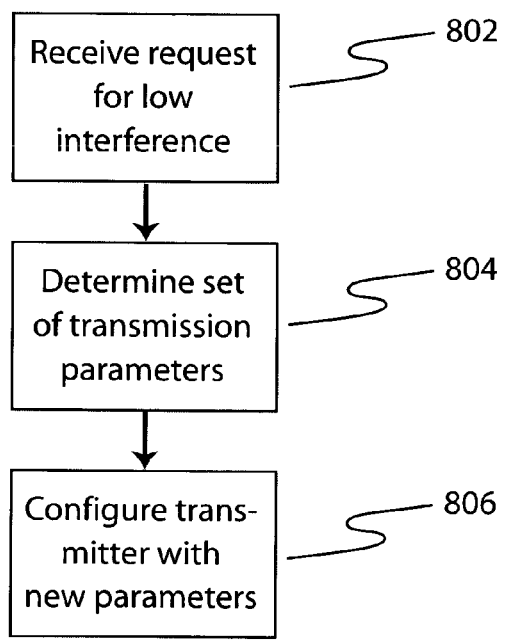
Figure 9:
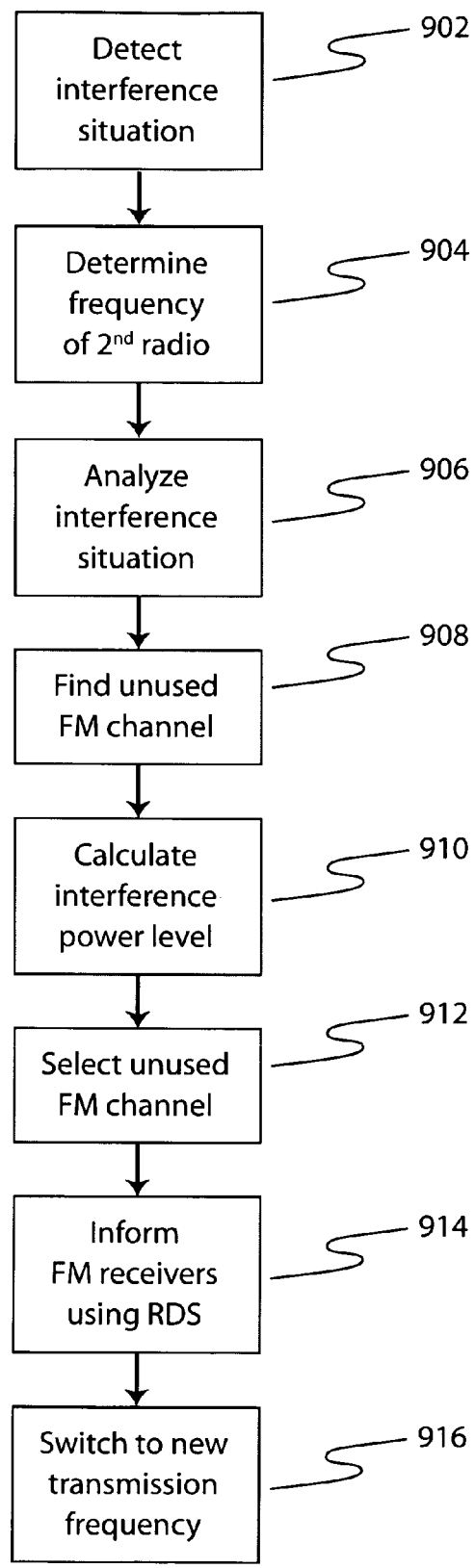

In the following, the invention will be described in greater detail with reference to the embodiments and the accompanying drawings, in which FIG. 1 shows a block diagram of a communication device employing a number of radio connections, FIG. 2 illustrates an example of architecture of a communication device, FIG. 3 shows a table for interference calculation based on harmonics, FIG. 4 shows a frequency spectrum of a WCDMA transmission, FIG. 5a shows an exemplary transmitter for changing transmission parameters, FIG. 5b shows a further embodiment of the exemplary transmitter from in FIG. 5a, FIG. 6 shows an exemplary oscillator allowing configuration by parameters, FIG. 7 shows the frequency spectrum of FIG. 4 after installing modified transmission parameters, and FIG. 8 shows a method according to the invention, and FIG. 9 shows method steps of an embodiment according to the invention.

DESCRIPTION OF EMBODIMENTS

Next, a structure of a communication device employing a number of simultaneous radio connections will be described with reference to FIG. 1. The communication device 100 may be for example a mobile communication device, a computer, a laptop, or a PDA (Personal Digital Assistant). The communication device 100 may also be a combination of two electronic devices, such as a computer with a mobile communication device connected to the computer. An example of a combination of a PDA and a mobile communication device is the Nokia Communicator®.

The communication device 100 comprises a number of wireless communication interfaces 112 to 118 to provide a wireless radio connection. The wireless communication interfaces 112 to 118 may be configured to provide connections employing different radio access technologies. In our example, the wireless communication interface 112 provides a communication link 132 with a GSM (Global System for Mobile Communications)-system through a serving GSM base transceiver station 122. The wireless communication interface 114 provides a WLAN (Wireless Local Area Network) connection 134 with a serving WLAN access point 124. A wireless communication interface 118 provides another wireless connection 138, using Bluetooth®-technology, with a device 128. In addition, an FM transmitter 116 provides a wireless connection to an FM radio receiver 126 by FM transmission 136. The FM transmitter is used to transmit a frequency modulated audio signal, e.g. created from audio files stored in memory 106 like MP3-files.

The wireless communication interfaces 112 to 118 described above may be using partially the same components of the communication device 100 during the operation of radio connections 132 to 138. The wireless communication interfaces 112 to 118 may be using for example the same antenna or antennas, radio frequency amplifier, and/or radio frequency filter. A wireless communication interface may use more than one antenna for diversity reception/transmission, as shown for wireless communication interface 112. Each wireless communication interface 112 to 118 may naturally have its own components or only some of the wireless communication interfaces 112 to 118 may be using the same components.

In the example of FIG. 1, four communication interfaces 112 to 118 are provided in the communication device, these interfaces 112 to 118 providing the Bluetooth® connection 138, the GSM connection 132, the WLAN connection 134, and the FM transmission 136, respectively. It should, however, be appreciated that the communication device according to the invention is limited neither to the number of communication interfaces in the communication device nor to the wireless communication technology the communication interfaces provide. Thus, the communication device may comprise several communication interfaces providing connections based on, for example, the following technologies: GSM, WLAN, WIMAX, Bluetooth®, WCDMA (Wideband Code Division Multiple Access), WCDMA LTE (Long Term Evolution), GPRS (General Packet Radio Service), EDGE (Enhanced Data Rates for GSM Evolution), DVB-H (Digital Video Broadcasting for Handheld devices), UWB (Ultra Wideband), GPS (Global Positioning System), FM radio, RF-ID (Radio Frequency Identification), CDMA2000, and 3G Long Term Evolution. Other wireless communication technologies are also possible to be implemented in the communication device according to the invention. It can be seen from the examples that a communication interface can be unidirectional, i.e. implementing only a transmitter (like an FM transmitter) or only a receiver (like a DVB-H receiver), or that a communication interface can be bidirectional, i.e. implementing both a receiver and transmitter (like GSM, WLAN or Bluetooth).

The communication device 100 further comprises a control unit 104 to control functions of the device 100. The control unit 104 is configured to create radio connections between the communication device 100 and other communication devices or networks. The control unit 104 is also configured to control a number of simultaneous radio connections in the communication device 100. The control unit 104 may be implemented with a digital signal processor with suitable software or with separate logic circuits, for example with an ASIC (Application Specific Integrated Circuit). The control unit 104 may also be a combination of these two implementations, such as a processor with suitable software embedded within an ASIC. Alternatively, software for the control unit 104 is stored in memory 106.

The communication device 100 further includes one or more measuring units 110 for measuring the quality of a radio link of communication processes that are operational at the terminal. When estimating the quality of a radio link, the measuring unit provides a quality estimate of the radio channel of each communication process. The quality estimate may be provided as a bit-error-rate (BER), frame-error-rate (FER), signal-to-interference ratio (SIR) or any other appropriate quality measure. In an alternative embodiment, the measuring unit or units are part of the wireless communication interfaces 112-118.

The control unit 104 is configured to have a connection to the measuring unit 110 so as to receive a quality estimate of the radio channel of a radio process regularly or on request by the control unit 104. In addition, the control unit 104 may instruct the measuring unit 110 to provide a quality measurement for radio channels related to the channel of a radio process, like channels adjacent to the channel of the radio process, alternate channels, i.e. channels that may alternatively be used for the radio process, and channels that have a frequency relationship with the channel of the radio process. A channel has a frequency relationship to the channel of the radio process, if harmonics or mixing products of the channel of the radio process fall partly or fully within the channel. The measuring unit 110 provides the quality estimate to the control unit 104.

Control block 104 processes the information from measuring unit 110 and further information (e.g. transmission power levels, transmission/reception timings) from wireless communication interfaces 112-118 to determine the existence of an interference situation and to determine an interference level. Control block 104 may determine if the interference is coming from the communication device 100 itself or from a transmitter included in an external device, e.g. device 122, 124 or 128. Control block 104 may be capable of identifying and distinguishing interference caused by wide band noise, adjacent or alternative channel leakage power, a modulation of the interference signal, a harmonic transmission, or a substantially continuous wave interference. Control block 104 may further be capable of determining a frequency, band width and timing of an interference signal. Control block 104 may further be capable of identifying harmonics and mixing products causing an interference situation.

The device may also include one or more sensors for monitoring external or internal conditions of the device. A sensor may monitor the temperature of the device. Another option is that a sensor detects the operational mode of the device. For example, the sensor may detect whether a clamshell mobile phone is used in an open or closed position. A further sensor can detect the position or orientation of the terminal.

In a further embodiment, several diversity reception antennas are available, as shown for communication interface 112. Position and/or orientation information and/or information whether the clamshell mobile phone is in an open or closed position may be utilized as a basis for antenna selection for transmission or reception. In an alternative embodiment, an antenna beam can be steered based on the information from sensors 140 about the position and/or orientation of the terminal and operational mode of the terminal. In a further alternative embodiment, an operational antenna is changed or tuned based on the information from the sensors about the operational mode of the terminal.

The communication device 100 further comprises a user interface 102 connected to the control block 104. The user interface 102 may comprise a keyboard, a microphone, a loudspeaker, a display, and/or a camera.

The communication device 100 usually comprises a voltage source 108 to provide current for the operation of the device 100. The voltage source may be for example a rechargeable battery.

FIG. 2 illustrates an example of architecture of an exemplary communication device implemented according to the invention. The architecture is depicted in a layered form, like an OSI (Open Systems Interconnection) model of ISO (International Organization for Standardization), with lower layers providing services to higher layers.

On the highest layer are provided applications 200 to 205 that may need a radio connection. The application 200 to 205 may be for example an application handling a voice call, a web or WAP (Wireless Application Protocol) browser, an e-mail client, a GPS navigation application, a gaming application, or a media player application. The communication device may also comprise other applications. Whenever an application 200 to 205 needs a radio connection to another communication device or network, the application sends a request to a lower layer to establish the connection. During the operation of the connection, the application sends data related to the application to lower layers for transmission over the connection to the other communication device. Optionally, the application receives data related to the application from the other communication device via the connection through the lower layers. When a need no longer exists to maintain the connection, the application sends a request to a lower layer to terminate the connection.

On the lower layer, services may be provided to the applications 200 to 205 by a connection selection manager 206. The connection selection manager 206 may select an appropriate connection for an application based on a set of connection profiles stored in its database. A user or an operator, for example, may define the connection profiles, and the profiles may be based on optimization of some criterion, for example throughput, bit error rate, air-interface interference scenario, or cost-efficiency of the connection. The connection selection manager 206 is an optional layer in the architecture of the communication device, since the applications 200 to 205 may alternatively be designed to define the suitable connections by themselves.

The next lower layer is a multiradio controller 208. The multiradio controller 208 establishes, controls, and terminates radio connections according to the connection requirements from the higher layers. The multiradio controller 208 is also responsible for taking care of the simultaneous operation of multiple radio connections.

The multiradio controller 208 may be a two-fold entity. First of all, there is a common control element 210, which communicates with the higher layers. It receives requests for creating and terminating a radio connection from the applications 200 to 205 or the connection selection manager 206, if present. The common control element 210 may also check the availability of the radio connection requested from a higher layer, and either start a process for creating a radio connection or inform higher layers that the requested radio connection is not currently available. The common control element 210 is also responsible for controlling the simultaneous operation of multiple radio connections by adjusting the parameters of an existing connection whenever a new radio connection which would interfere with an existing radio connection is created, or whenever the common control element 210 detects a sufficient change in the properties of an existing connection.

The multiradio controller 208 also comprises radio-specific entities 212 to 226. Each radio-specific entity can be seen as an interface between the common control element 210 of the multiradio controller 208 and the specific radio interface. A radio-specific entity takes care of controlling one radio connection according to the parameters received from the common control element 210. A radio-specific entity is close to the physical layer of the connection, which enables rapid adaptation to the changing environment and fast control of the connection. The functionality of each radio-specific entity is radio-system-specific, which means that the parameters from the common control element 210 are adapted according to the standard specifications of the radio system. A radio-specific entity may also supply the common control element 210 with measured properties of the connection it controls. The measured properties of the connection may comprise the bit error rate (BER), block error rate, or the frame error rate (FER) of the connection. The measured properties may also comprise received energy per chip divided by the noise power density in the band (Ec/No), interference signal code power (ISCP), received signal code power (RSCP), received signal strength indicator (RSSI), signal-to-interference-power ratio (SIR). For a transmitter, the measured properties may comprise a transmission signal error vector magnitude (EVM), a local oscillator leakage, or a frequency error of the transmission.

In an embodiment of the multiradio controller, radio-specific entities are not included in the multiradio controller. Instead, the multiradio controller may have an interface to an external entity providing the interface to each radio.

Below the radio-specific entities 212 to 226 in FIG. 2, the communication interfaces 228 to 242 are provided. Each communication interface takes care of encoding and decoding data into suitable electrical waveforms for transmission and reception on the specific physical media used. This process is carried out according to each radio-access-specific standard. The architecture of FIG. 2 employs physical layers of EDGE, WCDMA, WLAN, Bluetooth®), DVB-H, UWB, GPS radio access technologies and FM transmission, but the operation of the multiradio controller is not limited to these technologies as it can be configured to control also other wireless radio access technologies.

In an example embodiment of the architecture in FIG. 2, all parts above the communication interfaces 228 to 242 are implemented by software, e.g. software that is stored in memory 106 and is executed by controller 104. Communication interfaces 228 to 242 then correspond to exemplary wireless communication interfaces 112 to 116, previously described in connection with FIG. 1.

For signalling with a base station or a remote receiver of a communication system, the apparatus 100 may need to map the quality estimate from measuring unit 110 to another value provided by a signalling protocol of the communication system in question. For instance, a BER measured by the measuring unit 110 may be mapped to a channel quality indicator (CQI), or equivalent, for signalling purposes from the terminal to a base station. For mapping a BER to CQI, the control unit may have a look-up table or a calculation unit configured to calculate a CQI value from the BER. The CQI value may, for instance, be assigned any value between 0 and 31, depending on the quality of the channel. CQI has here been referred to only as an example of a quality parameter, and the quality estimate of the radio link may be signalled by means of some other corresponding parameter used in the communication system.

A low quality indication, e.g. by a low value of a CQI, may trigger an activity to avoid an interference situation. The quality indication or value of a CQI is determined to be low, if the quality indication or the CQI value is below a threshold. Alternatively, it can be determined whether a measured interference level is above a threshold.

A low quality estimate or a low quality indication can be caused by interference both from within the device or from an external source. Thus, an interference level can be deduced or at least be assumed from a low quality estimate or indication. A possible cause for an interference situation can be looked for in the device itself. In this way a possible interference situation can be determined, and it can be checked whether avoidance of interference reduces the interference level and/or improves the quality estimate or indication.

In an embodiment of the invention, it is analysed whether the interference situation is caused by multiradio operation within the apparatus 100 itself. This is done by checking the activities of wireless communication interfaces 112 to 118, extracting interference information from a database stored in memory 106 for the activity scenario, and comparing the interference information from the database with the experienced signal quality degradation indicated by the low quality indication or low CQI value. If the result is that multiradio operation within the apparatus is a potential cause of the experienced signal quality degradation, it is further analysed whether scheduling of the transmission and reception times of the interfering wireless communication interfaces may relieve the interference situation.

There are cases in which a scheduling operation cannot relieve the interference, as the activity of an interfering or interfered wireless communication interface is continuous or as the activity occupies so much time that no time slots are left over for other wireless communication interfaces to operate.

In an exemplary scenario, a substantially continuous transmitter, e.g. an FM transmitter, is actively sending an audio signal on an FM radio channel. FM radio requires continuous transmission. Therefore, a scheduling algorithm cannot be used to avoid interference of the FM signal. In the example, a GSM-RX signal is suffering from signal degradation at 954 MHz. The control unit 104 of FIG. 1 searches the database for possible interference situations of the active FM transmitter 116 and the GSM transceiver 112.

FIG. 3 shows a table stored in memory 106 that is used for an analysis of the interference situation. It shows a table with frequencies that may possibly be interfered by an FM transmission by harmonics of the transmission frequency. In the first row, the second entry shows the lower end of the FM frequency band in Megahertz (MHz) and the third entry shows the higher end of the FM frequency band (88-108 MHz), as it is used in many countries. In the first column the multiplication factors for the harmonic calculation are shown, and the second and third columns show the multiples of the lower and higher ends of the FM radio bands. For example, the third harmonic (row 3, factor 3 in first column) of a frequency within the FM radio band may potentially interfere with a frequency between 264 and 324 MHz. A given interference situation may then be calculated for a certain frequency. For example, the $3^{rd}$ harmonic of an FM radio frequency of 100 MHz may cause interference for another transceiver operating at 300 MHz (3*100 MHz).

Returning to the exemplary scenario, the control unit 104 of FIG. 1 finds that interference may occur at the $9^{th}$ and $10^{th}$ harmonic of the FM transmission for a GSM 900 system according to the table of FIG. 3. The FM transmission is found to operate at 106 MHz. Therefore, the $9^{th}$ and $10^{th}$ harmonics are calculated to be 954 MHz and 1060 MHz. Thus, the current interference situation is confirmed, as the FM transmission frequency at 106 MHz is a potential interference source for the GSM-RX signal operating at the $9^{th}$ harmonic of the FM transmission frequency.

A solution to the interference situation is to change the transmission frequency. A transmission frequency is selected in such a way, that both the $9^{th}$ and 10th harmonic are outside the GSM 900 reception band (935-960 MHz). For example, a transmission frequency of 102 MHz may be selected. The $9^{th}$ and $10^{th}$ harmonics are checked to be at 918 MHz and 1020 MHz. It is also verified by the measuring unit 110 that 102 MHz is an unused frequency in the reception area of the user, i.e. it is not occupied by a licensed transmission. Alternatively, the device can use the cell identification of the GSM system to obtain information about the present location of the apparatus. Using this information, the device consults a further database from memory 106 or e.g. from an internet service which may be contacted over WLAN connection 134, in order to receive information about free or used frequencies by licensed FM transmissions in the area. In this example, the frequency of 102 MHz is found not to be occupied by another transmission. If the FM transmitter supports the Radio Data System (RDS), it indicates a possible change to 102 MHz in the alternate frequency (AF) field of the Radio Data System (RDS). The FM transmitter then switches to the new frequency of 102 MHz. If RDS is not supported, apparatus 100 may indicate the switch to the new frequency of 102 MHz on the user interface (UI) 102, so that a user may manually tune an FM receiver 126 to the new frequency. In an alternative embodiment, apparatus 100 may require user confirmation (e.g. by a button press on the UI 102) before performing the transmission frequency switch.

In a further embodiment, information about nearby GSM base stations and especially on transmission frequencies used by nearby GSM base stations is used in the selection of an FM transmission frequency. This information may be obtained in GSM reception packets. This information is used in the selection of an FM transmission frequency in such a way, that an FM transmission frequency is selected whose harmonics do not interfere with any of the transmission frequencies used by nearby GSM base stations. If no such FM transmission frequency can be found, an FM transmission frequency is selected that interferes with as few as possible of the transmission frequencies used by nearby GSM base stations.

The exemplary scenario shows that it may be necessary to check more than one interference situation (here: interference with the GSM 900 RX band and interference with other licensed transmitters of the same band). It should be noted that no special sequence of performing the checks is required. However, in order to come to a result quickly, a check may be performed first which has the highest relevance. In the exemplary scenario, it may be essential to transmit on an unused frequency because of legislative rules. Thus, this requirement has a higher priority than the interference in the GSM 900 RX band, as still other remedies to improve the interference situation may be available. Therefore, it is first determined whether a different unused frequency is available.

It may occur that no frequency can be found for which interference is avoided. In a further example, an FM transmission interferes with a GSM system and a GPS reception. In a first scenario, a first new FM transmission frequency is determined that causes GSM interference, but no GPS interference, and a second new FM transmission frequency is determined which does not cause GSM interference, but GPS interference. In this example, a rule is defined that prioritises the GSM system with respect to the GPS system. The rule may be stored in memory 106. Applying the rule, the controller 104 will select the second frequency which does not cause any GSM interference. Rule definitions such as the one used in this example may also be defined or altered by a user, e.g. by entering them as system settings through UI 102.

Due to the operation of multiple wireless communication interfaces within a device, many interference situations with a substantially continuous transmitter can occur. The following list shows exemplary interference situations with an FM transmitter that can be deduced from the table of FIG. 3:

T-DMB (Terrestrial Digital Media Broadcasting) may be interfered at the $2^{nd}$ harmonic (T-DMB: 176-240 MHz);
DVB-H (digital video broadcasting, handheld) may be interfered from the $5^{th}$ to the $8^{th}$ harmonic of the FM transmitter (DVB-H: 470-750 MHz);
GSM/WCDMA 850 may be interfered from the $8^{th}$ and $9^{th}$ harmonic;
GSM/WCDMA 900 may be interfered from the $9^{th}$ and $10^{th}$ harmonic;
GSM/WCDMA 1800 may be interfered from the $17^{th}$ to $20^{th}$ harmonic;
GSM/WCDMA 1900 may be interfered from the $18^{th}$ to $22^{nd}$ harmonic;
WCDMA 2100 may be interfered from the $20^{th}$ to $24^{th}$ harmonic;
GPS may be interfered from the $15^{th}$ to $17^{th}$ harmonic.

Interference may also be caused by mixing products. Mixing products may occur if more than one radiating device within the apparatus 100 operates at the same time. So, if one transmitter operates at f1=800 MHz and a second transmitter operates at f2=100 MHz, mixing products are generated at f1+f2 and f1−f2. The second transmitter can also be a radiating component, e.g. a memory card reader operating at a read frequency f3=30 MHz. In this case, mixing products at f1+f3 and f1−f3 are generated.

Also harmonics can be included in the calculation of mixing products. So, further mixing products can occur at 2 (f1+f2), 2 f1+f2, f1+2 f2 etc.

In an embodiment of the invention, a table is stored in memory 106 including mixing products that are particularly relevant for interference calculation. In an example, the table includes information that for simultaneous transmission of the FM transmitter at f1 with a GSM transceiver at f2 mixing products of (f1+f2), (3*f1+f2) and (5*f1+f2) are relevant while other mixing products can be neglected.

Furthermore, interference may be generated in adjacent and alternative channels, as shown in FIG. 4. This is particularly relevant if the frequency bands of two systems are next to each other, and both systems are configured to operate at the same time. FIG. 4 shows a WCDMA transmission spectrum. On the horizontal axis the transmission frequency is shown. The vertical axis represents the transmission power. An FDD transmission band 402 with a frequency range from $f_1$ to $f_2$ is directly neighbouring a TDD RX/TX spectrum 404 ranging from $f_2$ to $f_3$. The next higher frequencies are occupied by a FDD reception band 406 from $f_3$ to $f_4$. Bandwidth allocation does not provide a free range between the transmission bands 402-406. Thus, signal energy of the WCDMA transmission spectrum 410 in the FDD transmission band 402 leaks into adjacent channel 412 at a level 422 and into alternative channels 414-418 at levels 424 and 426.

Frequency band allocation I of the WCDMA system is as follows:
TDD1: 1900-1920 MHz
FDD TX: 1920-1980 MHz
TDD2: 2010-2025 MHz
FDD RX: 2110-2170 MHz Here, no gap in the spectrum is left between TDD1 and FDD TX spectra.

Frequency band allocation VII of the WCDMA systems is as follows:
FDD TX: 2500-2570 MHz
TDD: 2570-2620 MHz
FDD RX: 2620-2690 MHz Here, no gap in the spectrum is left between TDD and FDD spectra.

Frequency band allocation of television channels and an example of the future WCDMA 700 system is as follows:
Television channels: 470-698 MHz
FDD TX: 698-710 MHz
FDD RX: 728-740 MHz
MediaFlo: 716 MHz-722 MHz.

Here, no gap in the spectrum is left between television channels and FDD TX spectrum. Examples of television channels are DVB-H, ATSC (Advanced Television Systems Committee), MediaFlo, or NTSC (National Television System Committee).

Similar spectrum allocation without gaps between bands can also be found for other systems.

In an embodiment of the invention, a transmission frequency of the FM transmitter is selected so that harmonics of the transmission frequency are not substantially too close to a frequency used in the wireless communication interface, e.g.

a GSM transceiver. Adjacent channel selectivity is a receiver performance parameter which indicates the capability to filter out adjacent or alternate channel interference of the receiver. The tolerated interference level and the tolerated interference frequency domain separation are a function of the adjacent channel selectivity. By informing the adjacent channel selectivity from the GSM transceiver to the FM transmitter, this information can be taken into account for the selection of an FM transmission frequency.

In a further exemplary scenario, there may be no option to select a different frequency for transmission, or the options for different frequencies for transmission do not result in an interference free situation. In such a scenario it is desirable to adjust further transmission parameters to reduce the interference level.

Thus, in another embodiment of the invention, further transmission parameters can be changed in the substantially continuous transmitter in order to effectuate a reduction of interference caused by harmonics, mixing products, wide band noise, adjacent channel power leakage etc. Examples of such further parameters are shown with reference to FIG. 5a. FIG. 5a shows an exemplary transmitter 500 capable to change transmission parameters on request. The request is received on input 542 to the transmitter control block 540. Transmitter control block 540 controls a number of parameters in the transmitter. Transmitter 500 may implement one of the transmitters that is found in wireless communication interfaces 112, 114, 118 or the substantially continuous transmitter 116.

Transmitter 500 receives from a baseband a digital IQ-signal 502 that is converted to analog by digital-to-analog converter (DAC) 504. A filter bank 506 with switchable and/or tuneable filters is used to filter the converted signal, before it is mixed with an oscillation frequency from oscillator 508 in mixer 510. After the mixer, the signal is amplified in the power amplifier module 512 which has switchable and/or tuneable amplifier stages 514-518. In addition, several filters can be switched into the signal path within the power amplifier. FIG. 5a shows a notch filter 520, a passband filter 522, a high pass filter 524 and a low pass filter 526. These filters can be switched into the signal path separately or in any combination. They can be provided at any place in the signal path, i.e. before or after any of the blocks 514, 516 or 518. For example, the low pass filter 526 can be used when a power level of the harmonics of the transmission needs to reduced. The high pass filter 522 can be used to reduce wide band noise to the lower frequencies, when e.g. TV channels are used in combination with a GSM/WCDMA transmitter. The band pass filter 520 can be used when there are other wireless communication systems used at both lower and higher frequencies than the frequency of the transmission. The amplified and filtered signal reaches the antenna 530 through duplex filter or switch 528, which provides attenuation between the signal path in the transmitter and the receive path 550.

In an alternative embodiment, transmitter 500 receives an analogue signal from the baseband, e.g. an audio signal, instead of the digital IQ-signal 502. In this case, DAC 504 can be left out.

FIG. 5a also shows a receive path 550. The receive path 550 may not be present in all embodiments of the invention. In an embodiment without a receive path, also switch or duplex filter 528 may also be omitted. As the receive path is not relevant for the understanding of the invention, it is only indicated in the figure, and no further explanation will be provided.

All elements and switches of receiver 500 that can be controlled are connected to transmitter control block 540. Transmitter control block 540 receives a request for low interference on input 542. The request may contain parameters like a frequency on which interference was detected or a level of interference. In response to the request for low interference, the transmitter control block 540 generates control signals on a control bus 544 in order to change parameters of the transmitter blocks 504-516 and to operate switches in the transmit path.

Transmitter control block 540 may be part of a radio specific entity 212-226 or the multiradio controller 208 from FIG. 2. Thus, functions of the transmitter control block 540 may be executed by control unit 104 from FIG. 1.

Parameters of the DAC 504 that may be changed to reduce interference are the number of bits and the clock frequency. In an interference-free situation, a clock frequency and a number of bits are selected so that standard requirements, e.g. requirements for a wireless standard like GSM or Bluetooth, are satisfied. In a situation in which interference is detected, a higher number of bits and a higher clock frequency are selected that result in a higher signal accuracy, meaning a lower level of harmonic frequencies in the signal, and also a lower spectral leaking in adjacent and alternative channels as shown in FIG. 4. By reducing the level of harmonics and spectrum leakage, an interference level in other systems is reduced.

When the clock frequency of the DAC is increased, a spectral replica of the transmission is moved away from the wanted transmission spectrum. This reduces interference in adjacent and alternative channels, since overlap of the wanted transmission spectrum and the spectral replica is avoided.

It is noted that a higher number of bits requires that the digital signal is provided from the baseband with the higher accuracy. A higher clock frequency requires a larger number of samples from the baseband. These can be generated by calculation, e.g. filtering or interpolation. In conventional implementations of a DAC, a higher clock frequency and/or number of bits results in a higher power consumption of the DAC and the baseband. Thus, it may not be desired to operate the DAC under interference-free conditions in a high accuracy mode with a higher clock frequency and/or a higher number of bits.

The baseband filter bank 506 comprises one or more switchable and/or tuneable filters. One or more filters may be selected in accordance with the used data connection speed in order to reduce spectral leakage into adjacent and alternative channels, as well as harmonics. Under interference-free conditions, less baseband filtering or less accurate baseband filtering can be used, as it may be desirable to reduce power consumption and design complexity. In a situation in which interference is detected, the one or more selected filters are switched in the signal path of the baseband filter bank 506. The filter or filters that are switched into the transmission path may be additional filters, i.e. they are switched into a position where there was no filter. In a further embodiment, they may be alternative filters that replace e.g. one or more less accurate filters or filters with a wider filter bandwidth.

In a further embodiment, a tuneable filter that has a tuneable filter bandwidth can be switched into the signal path of the baseband filter bank 506 in order to influence spectral leakage. In this embodiment, baseband filter bank 506 is controlled in the following way: If no interference is detected, the tuneable filter is not switched into the signal path. If interference is detected, or if it is detected that interference may occur, the tuneable filter is switched into the signal path. The bandwidth of the filter is adjusted in dependence on the bandwidth requirement. In addition, the filter is adjusted in dependence on the detected interference level.

In a further embodiment, baseband filter bank 506 can be configured to reduce wide band noise. The signal may be filtered as close as needed with respect to a required transmission bandwidth by filter bank 506. If a band pass filter is used, it may be configured to cover the whole transmission band or only the width of the transmission signal.

In transmitter 500, the filtered baseband signal is mixed with a signal from oscillator 508, e.g. a voltage controlled oscillator. The quality of the oscillator signal influences noise in the transmission signal, and thus interference. Therefore, several parameters can be adjusted in the oscillator as well, as shown for an exemplary embodiment 600 of oscillator 508 in FIG. 6.

FIG. 6 shows a frequency synthesizer 600 having a phase looked loop (PLL). A reference oscillator 602 generates a reference frequency signal which is fed into the PLL 604. The PLL 604 comprises a voltage controlled oscillator (VCO) 606, a frequency divider 608, a phase comparator 610 and a low pass filter 612. In the embodiment shown in FIG. 6, VCO 606 can operate at two frequencies: fosc1 (4 GHz) and fosc2 (8 GHz). At the higher frequency fosc2, the signal can be divided one more time by 2 in order to reach the desired frequency. This division reduces noise of the output signal 620 of the frequency synthesizer 600 by approximately 6 dB. A reduced noise level of the output signal 620 will also result in a reduced noise level of the output signal of the mixer 510 in FIG. 5a. Again, operating at a higher frequency and the additional division by 2 may increase power consumption.

In an alternative embodiment, dividers 616a-616c are implemented as fractional dividers with a ratio 1/m or n/m, n and m being integer values. Integer values n and m may be controlled by transmitter control block 540. Changing values n and m changes the synthesizer noise performance.

In a further embodiment of frequency synthesizer 600, the low pass filter 612 in the PLL 604 may also be tuned. The corner frequency of the low pass filter 612 may be changed to a smaller value so that the oscillator noise is reduced. As a further consequence, the frequency synthesizer settling time is increased. This may be acceptable, for example if no inter frequency handovers are needed. In a further embodiment, an additional filter is switched into the loop of the synthesizer, thus modifying the filtering and changing the frequency response of the loop and the speed of the synthesizer settling.

After the PLL, there may be a tracking filter 614 to filter out wide band noise apart from the local oscillator operational frequency. The frequency and the width of the filter can be controlled to optimize the noise performance of the frequency synthesizer 600. Similar tracking filters 618a-618c can be implemented after dividers 616a-616c in order to further reduce wide band noise.

Tracking filters 618a-618c can be implemented based on e.g. RC, RL, LC or RCL circuitry. Tracking can be implemented for example by implementing a capacitance of the circuitry with a variable capacitance diode, e.g. a PIN-diode. By adjusting a control voltage on the variable capacitance diode, the capacitance value, and thus the tracking filter frequency response is changed.

Returning to FIG. 5a, the output signal from mixer 510 is fed into power amplifier module 512. Power amplifier module 512 has switchable and/or tunable amplifier stages 514-518. An amplifier stage is switched into the signal path, if a higher amplification is needed. Likewise, one or more amplifier stages are removed from the signal path, thus bypassing the one or more amplifier stages, if a lower amplification is needed. Controlling the amplification changes the transmission power level of the substantially continuous transmitter, and thus the level of interference caused by the emitted signal and the emitted harmonics. Furthermore, amplifier stages 514 and 516 can be tuned. Thus, it is possible to control the amplifier bias and linearization, for example by feed forward, Cartesian or polar loop back loops and/or transmission predistortion. Controlling the linear operation changes the amount of emitted harmonics. Operating in a more linear mode may increase power consumption. Filters 520 to 526 can be switched in the signal path in the power amplifier module 512. Filter 520 represents a notch filter, filter 522 a pass band filter, filter 524 a high pass filter, and filter 526 a low pass filter. Each filter can be switched into the signal path individually or in any combination with another filter. Filtering in the power amplifier can reduce the level of harmonics and spectral leakage introduced by components after the last filter stage 506. Thus, harmonics, mixing products and spectral leakage caused by oscillator 508, mixer 510 and amplifier stages 514 and 516 are reduced.

In an alternative embodiment, the data speed of the transmission signal is reduced, so that the required width of the spectrum is reduced. In this way, also spectral leakage into adjacent and alternative channels is reduced. If the data speed of the transmission signal is changed, information about the change may be transmitted to the receiver(s), or the change may be negotiated with the receiver(s) in accordance with the capabilities of the receiver(s).

In a further embodiment, a more spectral efficient modulation method is used for transmission. For example, the modulation method is changed from BPSK (binary phase shift keying) to QPSK (quadrature phase shift keying). As the spectrum of QPSK modulation is narrower, spectral leakage into adjacent and alternative channels is reduced. If the modulation method of the transmission signal is changed, information about the change may be transmitted to the receiver(s), or the change may be negotiated with the receiver(s) in accordance with the capabilities of the receiver(s). In this embodiment, an I/Q modulator replaces mixer 510.

In a further embodiment, the transmitter uses a superheterodyne architecture. In this embodiment, an additional mixer and oscillator are used, and additional filters can be switched into the signal path at an intermediate frequency. The additional oscillator may be implemented as described with reference to FIG. 6, and the additional filters may also be tuneable.

In alternative embodiments, transmitter 500 has only some of the switchable and tuneable filters and amplifiers, or it may not be able to control parameters of the DAC 504 or the oscillator 508. It is however possible to form any combination of the previously described controllable elements.

In a further embodiment, transmitter 500 does not comprise an antenna connection to a receive path 550. In this case, switch 528 can be left out or be replaced by a filter.

In an alternative embodiment, shown in FIG. 5b, transmitter 500 supports transmission by at least a second antenna 531 in addition to a first antenna 530. The signal from power amplifier 512 is divided by switch or divider 560 and forwarded through switches or duplex filters 528, 529 to antennas 530, 531, respectively. The second switch or duplex filter 529 may be connected to a further receive path 551.

Switch or divider 560 is controlled by the transmitter control block 540 through signal bus 544 in such a way that the transmit signal from power amplifier 512 is either connected completely to either the path leading to the antenna 530 or the path leading to the second antenna 531, or it is controlled in such a way that the power from the transmit signal is divided in any ratio and fed into the paths leading to the antenna 530 and the second antenna 531.

In an example scenario, the second antenna 531 is further away from an antenna of another communication interface than antenna 530. Then, the antenna isolation from the second antenna 531 to the antenna of the other communication interface may be higher than the antenna isolation from antenna 530. Thus, the interference situation is improved by controlling switch or divider 560 in such a way, that all or a large proportion of the power from the transmit signal is routed to antenna 531 and only a small proportion of the power or no power of the transmit signal is routed to antenna 530.

In a further embodiment, power monitoring circuit 570 monitors power that is travelling to and from an antenna, e.g. antenna 530. Power monitoring circuit 570 can also be placed after power amplifier 518, so that power is monitored travelling to all antennas, or after switch or divider 560, thus monitoring power travelling to individual antennas. Power monitoring circuit 570 can be implemented with a capacitive coupling or with a dedicated coupler element. A dedicated coupler element may be a bidirectional coupler, which can monitor the transmission power which is delivered through the coupler element and/or power reflected from the antenna element. Information on the monitored power can be routed through signal 571 from power monitoring circuit 570 to a measurement block, e.g. measuring unit 110 from FIG. 1. Furthermore, the quality of the transmission signal can be monitored with any of following methods: observing the error vector magnitude, observing the local oscillator leakage or observing the frequency error of the transmission. An alternative method to observe the transmission signal quality is to observe the signal to noise ratio of the transmission.

In an alternative embodiment, block 570 monitors a matching condition of antenna 530. A change in the matching condition of antenna 530 may change antenna isolation between antenna 530 and an antenna of another communication interface. This, in turn, changes the interference condition in the other communication interface. An antenna resonance and/or antenna matching of the antenna 530 may be changed by a signal from signal bus 544. The antenna resonance and/or antenna matching of the antenna 530 can be optimised for example to give maximum antenna isolation between antenna 530 and the antenna of the other communication interface. Controlling the antenna resonance and antenna matching of the antenna 530 may further be performed according to any one of the following criteria: increase an antenna radiation efficiency, increase a power amplifier efficiency, decrease an insertion loss between a power amplifier and an antenna, or decrease an antenna VSWR (Voltage Standing Wave Ratio).

FIG. 7 shows the spectrum of FIG. 4 after applying the techniques described in relation to FIGS. 5a and 5b. The desired part of the spectrum 410 is not reduced in this example. However, due to the additional filtering, less noisy oscillator signal, improved D/A-conversion, etc., lower side spectra are found. The power level of the adjacent channel is reduced to a level denoted by reference number 432, the power levels of the next alternative channels are reduced to levels denoted 434 and 436, respectively.

FIG. 8 shows an exemplary method 800 that is used in the transmitter 500. In step 802, transmitter control block 540 of transmitter 500 receives a request for low interference, e.g. from a wireless communication interface like wireless communication interfaces 112-118, from a measuring unit like measuring unit 110, from a superordinate control instance like multiradio controller 208, or from another device. In an embodiment, the request contains parameters, further defining the kind of interference that is to be reduced. The request may contain a frequency or a frequency band, on which interference was observed. The request may further contain a level of interference, e.g. a measurement result like a bit error rate, a signal to noise ratio, a received signal strength indicator (RSSI), a quality estimate of the channel like a CQI value or another value related to the quality degradation caused by an interference situation. In a further embodiment, the request contains a desired interference level or a tolerable interference level that should be reached by the transmitter.

In a further embodiment, measuring unit 110 may indicate a degradation of the transmission signal quality of a first transmission. The degradation may be caused by a harmonic frequency of a second transmission, which appears at the transmission frequency of the first transmission. Due to the noticed degradation of the quality of the first transmission, a request for low interference is given to the transmitter of the second transmission.

In step 804 the transmitter control block 540 determines a set of transmission parameters that fulfil the required request. In this step it is decided whether the transmission frequency can be changed. It is also decided how to configure DAC 504 and tunable filters and amplifiers like filter 506 and amplifiers 514 and 516. It is further decided which filters and amplifiers to switch into the transmission path, like filters of filter bank 506 or filters 520-526 in power amplifier module 512.

In step 806 the transmitter control block 540 configures the transmitter blocks with the new parameters through control bus 544. Optionally, transmitter 500 informs receivers of its transmissions about the change of parameters before the new transmission parameters are applied and the change is made.

Transmitter control block 540 can be implemented as a function of a control unit 104 of device 100. The determination of transmission parameters can be performed using look-up tables that are stored in memory 106. A look up table may contain entries comprising a complete set of transmission parameters for interference scenarios. For example, GSM transceiver sends a request to FM transmitter to reduce interference into GSM band at 954 MHz. The control block 540 of the FM transmitter looks for an entry into a loop-up table for the interference scenario of GSM interference at 954 MHz and an FM transmitter frequency at 106 MHz. The look-up table proposes alternate FM transmitter frequencies at 102 MHz, 101 MHz and 100 MHz. FM transmitter then tests frequency 102 MHz whether it is used already. This is done by checking the signal strength at the frequency 102 MHz. If the frequency is found not to be used already, transmitter 500 tunes to the frequency of 102 MHz.

In an alternative embodiment, the look up table contains a formula to calculate a usable frequency or one or more transmitter parameters. In the scenario above, the look up table contains an instruction to select a frequency f that satisfies f*10<935 MHz OR f*9>960 MHz OR (f*9<935 MHz AND f*10>960 MHz).

In a different scenario, a WCDMA/TDD system operating at 2570-2620 MHz experiences interference from a FDD TX system at 2500-2570 MHz. The WCDMA/TDD system sends a request for low interference to the FDD TX system. The request contains the information that interference is experienced at the low end of the WCDMA/TDD band. FDD TX transmitter contains a transmitter control block 540 as shown in FIG. 5a. Transmitter control block 540 looks up the scenario in a look-up table in memory, and finds that in order to reduce interference filter parameters of filter 506 have to be changed and that pass band filter 522 has to be switched into the signal path in the power amplifier module 512.

After the interference situation has ended, the TDD system informs the FDD TX system about the end of the interference situation. The transmitter control block then applies parameters that shall be used if no interference is observed, as operation of the transmitter with these parameters may save power.

In an alternative embodiment, transmitter control block 540 receives requests for low interference from a multiradio controller instance such as that shown in FIG. 2 (block 208). The multiradio controller 208 receives requests for low interference from radio specific entities 212-226. Multiradio controller 208 then combines requests for low interference, and sends a combined requests for low interference to radio specific entities 212-226. In a further alternative embodiment, multiradio controller 208 also performs the method of FIG. 8 and sends configuration parameters directly to radio specific entities 212-226 in order to configure radios 228-242.

FIG. 9 shows a process 900 that is performed in view of simultaneous operation of an FM transmitter and a second radio, e.g. in a wireless communication interface. In step 902 an interference situation is detected, e.g. by multiradio controller 208. In one embodiment, the second radio is a radio receiver for the T-DMB (Terrestrial Digital Multimedia Broadcasting) system, which has an allocated frequency band of 176-240 MHz. Thus, multiradio controller 208 determines that the $2^{nd}$ harmonic falls into the T-DMB band (for example by consulting the table from FIG. 3). In step 904, multiradio controller 208 determines the T-DMB reception frequency. It then analyses the interference in step 906 by calculating that the second harmonic of the used transmission frequency interferes with the T-DMB frequency used in the present reception. In this scenario, multiradio controller 208 has implemented instructions to find a non-interfering transmission frequency for the FM transmitter. Thus, in step 908, it performs an FM channel scan in order to find unused channels. In step 910, multiradio controller 208 calculates an interference power level for at least one unused frequency regarding interference into the T-DMB radio receiver. In this step, also neighbouring channels are taken into account, as channel leakage into neighbouring channels can also lead to an interference level in harmonics. In this scenario, a transmission frequency for the FM transmitter should not be selected if it is found that an adjacent channel at the second harmonic is used by T-DMB reception. At step 912, multiradio controller 208 then selects an unused channel that doesn't cause interference or which causes interference below a predetermined threshold in the T-DMB reception. In step 914, FM receivers in the environment are informed about the new transmission frequency by the RDS system, i.e. by transmitting the new frequency value as AF (alternate frequency) information of the RDS system. In step 916, the FM transmitter switches to the new transmission frequency.

In alternative embodiments, not all steps of process 900 are performed. For example, step 906 can be omitted, if sufficient details about the interference situation are already known. Embodiments not having an RDS enabled FM transmitter will leave out step 914. Instead, an information note about a channel change may be shown on UI 102, asking a user to change the frequency that one or more FM receivers are tuned to.

A use case in which the method of FIG. 9 may be applied, is, for example, an in-car scenario in which passengers on the back seat are watching a mobile TV transmission that is received from the T-DMB system by a mobile device. The associated sound track is routed for playback through the car stereo system. Thus, the sound from the T-DMB reception is routed to the FM transmitter module in the mobile device and transmitted to the car stereo system. The user tunes the car stereo system to the transmission frequency in order to playback the T-DMB sound track on the car stereo system.

In a further embodiment, the substantially continuous transmitter and the at least one wireless communication interface are in different devices. For example, the substantially continuous transmitter is in a first mobile device, and the at least one wireless communication interface is in a second mobile device. The at least one wireless communication interface notices an interference situation and sends a request for low interference to the first mobile device, e.g. through a wireless communication link like Bluetooth. Again, the request may contain parameters like a frequency on which interference was detected or a level of interference. In response to the request for low interference, the first mobile device determines whether the interference situation could have been caused by the substantially continuous transmitter in the device. For example, the first mobile device checks whether the substantially continuous transmitter was active, at which frequency the substantially continuous transmitter was transmitting and whether the used frequency has a direct relationship with the frequency at which interference was seen, as indicated in the request for low interference. If it is confirmed that interference could have been caused by the substantially continuous transmitter in the first mobile device, the transmitter control block within the first mobile device puts out control signals on a control bus in order to change parameters of the substantially continuous transmitter in the first mobile device in order to reduce the interference level.

In a further embodiment, the second mobile device uses a wireless dedicated communication link for sending the request for low interference to the first mobile device, for example a Terminal-to-Terminal interference communication channel (TtT). A logical or physical channel of a communication system can be used as a TtT interference communication channel. The channel can be dedicated as a TtT interference communication channel all the time or for a fixed time.

For example, the TtT interference communication channel can be a dedicated scrambling and spreading code channel of the CDMA system. The TtT interference communication channel may be used in fixed time intervals, so that a receiver knows when to listen for communication on this channel. A request for low interference may be valid for a pre-determined time or until a further communication on this channel informs the first mobile device about an end of the interference situation, e.g. when the second mobile device stops using the at least one wireless communication interface. Furthermore, an indication of the duration of the request for low interference can be contained in the request. If the interference situation persists longer than the indicated duration, the second mobile device sends a new request before the earlier one expires.

Similarly, in an OFDMA (Orthogonal Frequency Division Multiple Access) system, at least one sub-carrier can be dedicated to a TtT communication channel.

In a further embodiment, the second mobile device sends the request for low interference to a network, e.g. a cellular network like GSM. The request may include at least one of the following parameters: a terminal identification number of the second mobile device and/or the identified first mobile device, an IP (Internet Protocol) address of the first and/or second mobile device, location information of the first and/or second mobile device, an interference frequency, an interference level, an interference timing pattern, an interference modulation, an interference communication system, an interference band width, a current frequency used by the first and/or second mobile device, and an alternative channel lists of the first and/or second mobile device.

The network then routes the request for low interference to the first device. The determination whether the interference situation could have been caused by the substantially continuous transmitter in the first mobile device may be done by the first mobile device or by the network, for example a controller within the network. The controller may find that more than one request is received from devices in an area. The controller may forward only a single request to the first mobile device. The controller may modify the requested level of low interference in such a way that a requested level of low interference is related to the number of received requests from devices.

In a further embodiment, the first mobile device informs the second mobile device that parameters were changed in order to reduce interference. The second mobile device may then confirm that the interference situation has improved.

The disclosed functionality in various embodiments may be implemented by way of a computer program product encoding a computer program of instructions for executing a computer process of the above-described method. The computer program product may be implemented on a computer program distribution medium. The computer program distribution medium may be any of the known ways of distributing software, such as a computer readable medium, a program storage medium, a record medium, a computer readable memory, a computer readable software distribution package, a computer readable signal, a computer readable telecommunication signal, and a computer readable compressed software package. Alternatively, some of the functionality may be implemented by hardware, such as ASIC (Application Specific Integrated Circuit) or by a combination of hardware and software.

Even though the invention has been described above with reference to an example according to the accompanying, drawings, it is clear that the invention is not restricted thereto but it can be modified in several ways within the scope of the appended claims.

The invention claimed is:

1. A method, comprising:
monitoring an activity of a transmitter;
monitoring an activity of at least one wireless communication interface, wherein the at least one wireless communication interface is operated at scheduled intervals;
transmitting by the transmitter continuously or at intervals shorter than the scheduled intervals of the at least one wireless communication interface;
receiving an indication of an interference level of the transmitter in the at least one wireless communication interface;
when the received interference level is above a threshold, determining a new value for at least one transmission parameter of the transmitter to reduce the interference level;
determining whether the interference level is caused by the transmitter;
providing the new value for the at least one transmission parameter to the transmitter, said parameter comprising a parameter of the continuous transmission or the transmissions at intervals shorter than the scheduled intervals of the at least one wireless communication interface; and
selecting the new value of the at least one transmission parameter based on at least one of an operational frequency, a modulation method, a received signal level, and a received signal quality of the at least one wireless communication interface, wherein selecting the new value of the at least one transmission parameter comprises estimating at least one harmonic frequency of the transmitter when operating with the new value of the at least one transmission parameter.

2. The method of claim 1, wherein said at least one transmission parameter comprises at least one of a frequency for transmission and a transmission power level.

3. The method of claim 1, wherein the changing of the at least one transmission parameter comprises selecting at least one of an alternative filter and an additional filter in a transmit path of the transmitter.

4. The method of claim 1, wherein the changing of the at least one transmission parameter comprises adjusting at least one parameter of at least one filter in the transmit path of the transmitter.

5. The method of claim 1, wherein the changing of the at least one transmission parameter comprises modifying filtering in a frequency synthesizer used in the transmitter.

6. The method of claim 1, wherein the at least one transmission parameter comprises an operating frequency of a voltage controlled oscillator in a frequency synthesizer.

7. The method of claim 1, wherein the changing of the at least one transmission parameter comprises a biasing control of one or more stages in a power amplifier of the transmitter.

8. The method of claim 1, wherein the changing of the at least one transmission parameter comprises a linearization of one or more stages in the power amplifier of the transmitter.

9. The method of claim 1, wherein the changing of the at least one transmission parameter comprises at least one of a selection and an amplification of one or more amplifier stages in a transmit path of the transmitter.

10. The method of claim 1, wherein said at least one transmission parameter comprises at least one of a clock frequency and a number of bits of a digital-to-analog converter operating in the transmitter.

11. The method of claim 1, further comprising:
communicating the at least one transmission parameter to the at least one wireless communication interface before changing the at least one transmission parameter of the transmitter to the new value.

12. A method, comprising:
transmitting in a frequency modulation band on a first transmission frequency;
receiving information on unused channels in the frequency modulation band;
receiving information on activities of one or more wireless communication interface, wherein the at least one wireless communication interface is operated at scheduled intervals;
receiving an indication of interference levels for the one or more wireless communication interface based on the frequency modulation transmission on the first transmission frequency, wherein the frequency modulation transmission comprises continuous transmission or the transmissions at intervals shorter than the scheduled intervals of the at least one wireless communication interface;
determining whether the interference level is caused by the transmitter;
when the received interference level is above a threshold and the interference level is determined to be caused by the transmitter, selecting a second transmission frequency for transmission in the frequency modulation band for which the interference levels in the one or more wireless communication interface are below predetermined thresholds, wherein the second transmission frequency comprises a frequency for the continuous transmission or the transmissions at intervals shorter than the scheduled intervals of the at least one wireless communication interface, wherein selecting the second transmission frequency comprises estimating at least one harmonic frequency of the transmitter when operating with the second transmission frequency; and changing transmission in the frequency modulation band to the second transmission frequency.

13. An apparatus, comprising:
a transmitter;
at least one wireless communication interface; and
a processor configured to
  receive an indication of an interference level of the transmitter at the at least one wireless communication interface, wherein the at least one wireless communication interface is operated at scheduled intervals;
  transmit continuously or at intervals shorter than the scheduled intervals of the at least one wireless communication interface;
  compare the interference level with a threshold,
  when the interference level is above the threshold, the processor is further configured to
    determine whether the interference level is caused by the transmitter,
    determine a new value of a transmission parameter of the transmitter that reduces the interference level, said parameter comprising a parameter of the continuous transmission or the transmissions at intervals shorter than the scheduled intervals of the at least one wireless communication interface,
    provide the new value for the at least one transmission parameter to the transmitter, and
    select the new value of the transmission parameter based on at least one of an operational frequency, a modulation method, a received signal level, and a received signal quality of the at least one wireless communication interface, wherein selecting the new value of the at least one transmission parameter comprises estimating at least one harmonic frequency of the transmitter when operating with the new value of the at least one transmission parameter.

14. The apparatus of claim 13, wherein said at least one transmission parameter comprises at least one of a frequency for transmission and a transmission power level.

15. The apparatus of claim 13, wherein the transmitter comprises a transmit path with switchable filters, and wherein the at least one transmission parameter comprises a selection of filters in the transmit path.

16. The apparatus of claim 13, wherein the transmitter comprises a transmit path with adjustable filters, and wherein the at least one transmission parameter comprises an adjustment of one or more filters in the transmit path.

17. The apparatus of claim 13, wherein the transmitter comprises a frequency synthesizer with switchable filters, and wherein the at least one transmission parameter comprises a selection of filters in the frequency synthesizer.

18. The apparatus of claim 13, wherein the transmitter comprises a transmit path with one or more switchable stages of a power amplifier, and wherein the at least one transmission parameter comprises a selection of one or more stages in the power amplifier.

19. The apparatus of claim 13, wherein the transmitter comprises a transmit path with one or more adjustable stages of a power amplifier, and wherein the at least one transmission parameter comprises an adjustment of one or more stages in the power amplifier.

20. The apparatus of claim 13, wherein the transmitter comprises a digital-to-analog converter, and wherein the at least one transmission parameter comprises at least one of a clock frequency and a number of bits of the digital-to-analog converter.

21. The apparatus of claim 13, further comprising communicating the at least one transmission parameter to the at least one wireless communication interface before changing the at least one transmission parameter of the transmitter to the new value.

22. An apparatus, comprising:
a transmitter;
at least one wireless communication interface configured to receive an indication of an interference level, wherein the at least one wireless communication interface is operated at scheduled intervals, wherein said transmitter is configured to transmit continuously or at intervals shorter than the scheduled intervals of the at least one wireless communication interface; and
a processor configured to
  determine whether the interference level is caused by the transmitter,
  determine a new value of a transmission parameter of the transmitter that reduces the interference level, said parameter comprising a parameter of the continuous transmission or the transmissions at intervals shorter than the scheduled intervals of the at least one wireless communication interface,
  provide the new value for the at least one transmission parameter to the transmitter, and
  select the new value of the at least one transmission parameter based on at least one of an operational frequency, a modulation method, a received signal level, and a received signal quality of the at least one wireless communication interface, wherein selecting the new value of the at least one transmission parameter comprises estimating at least one harmonic frequency of the transmitter when operating with the new value of the at least one transmission parameter.

23. An apparatus, comprising:
a transmitting means;
at least one transceiving means; and
a processing means for
  receiving an indication of an interference level of the transmitting means in the at least one transceiving means,
  comparing the interference level with a threshold,
  when the interference level is above the threshold, the processing means is further for
    determining whether the interference level is caused by the transmitting means,
    determining a new value of a transmission parameter of the transmitting means that reduces the interference level,
    changing the at least one transmission parameter of the transmitting means to the new value, and
    selecting the new value of the at least one transmission parameter based on at least one of an operational frequency, a modulation method, a received signal level, and a received signal quality of the at least one wireless communication interface, wherein the at least one wireless communication interface is operated at scheduled intervals, wherein said transmitter is configured to transmit continuously or at intervals shorter than the scheduled intervals of the at least one wireless communication interface; wherein selecting the new value of the at least one transmission parameter comprises estimating at least one harmonic frequency of the transmitter when operating with the new value of the at least one transmission parameter, said parameter comprising a parameter of the continuous transmission or the transmissions at intervals shorter than the scheduled intervals of the at least one wireless communication interface.

24. A computer program embodied on a non-transitory computer readable storage medium, the computer program being configured to control a processor to perform:
  monitoring an activity of a transmitter;
  monitoring an activity of at least one wireless communication interface, wherein the at least one wireless communication interface is operated at scheduled intervals, wherein said transmitter is configured to transmit continuously or at intervals shorter than the scheduled intervals of the at least one wireless communication interface;
  when the transmitter is active and the at least one wireless communication interface is active, receiving an indication of an interference level of the transmitter in the at least one wireless communication interface;
  when the received interference level is above a threshold, determining a new value for at least one transmission parameter of the transmitter to reduce the interference level, said parameter comprising a parameter of the continuous transmission or the transmissions at intervals shorter than the scheduled intervals of the at least one wireless communication interface;
  determining whether the interference level is caused by the transmitter;
  changing the at least one transmission parameter of the transmitter to the new value; and
  selecting the new value of the at least one transmission parameter based on at least one of an operational frequency, a modulation method, a received signal level, and a received signal quality of the at least one wireless communication interface, wherein selecting the new value of the at least one transmission parameter comprises estimating at least one harmonic frequency of the transmitter when operating with the new value of the at least one transmission parameter.

\* \* \* \* \*